United States Patent [19]

Boe

[11] Patent Number: 4,644,429
[45] Date of Patent: Feb. 17, 1987

[54] TRAVERSING APPARATUS FOR LOADING A MAGNETIC HEAD-LOADING ARM ASSEMBLY ONTO ROTATABLE DISCS

[75] Inventor: Craig L. Boe, Buellton, Calif.

[73] Assignee: Applied Magnetics Corp., Goleta, Calif.

[21] Appl. No.: 498,178

[22] Filed: May 26, 1983

[51] Int. Cl.[4] .................. G11B 21/22; G11B 21/20
[52] U.S. Cl. .................................... 360/105; 360/103
[58] Field of Search ............... 360/105, 104, 103, 99, 360/98, 97

[56] References Cited

U.S. PATENT DOCUMENTS

| | | | |
|---|---|---|---|
| 3,702,997 | 11/1972 | Jamieson | 360/105 |
| 3,713,121 | 1/1973 | Fasano et al. | 360/105 |
| 4,058,844 | 11/1977 | Dirks | 360/106 |
| 4,071,867 | 1/1978 | Pejcha | 360/109 |
| 4,328,521 | 5/1982 | Pexton et al. | 360/104 |
| 4,392,165 | 7/1983 | Wright | 360/105 |
| 4,402,025 | 8/1983 | Anderson et al. | 360/98 |

OTHER PUBLICATIONS

Bosier et al., "Retraction Tool for Magnetic Heads", IBM Technical Disclosure Bulletin, vol. 16, No. 12, May, 1974.

Primary Examiner—Stuart N. Hecker
Assistant Examiner—Benjamin E. Urcia
Attorney, Agent, or Firm—Daniel J. Meaney, Jr.

[57] ABSTRACT

Apparatus for traversing a magnetic head-loading arm assembly onto a pair of spaced rotating discs is shown. The assembly comprises two parallel loading arms, one of which has two pairs of spaced gimbaled magnetic recording and reproducing head assemblies resiliently supported thereon from the upper and lower side thereof. The apparatus further includes a comb assembly having a pivotally mounted first canted sweep arm formed of first and second fixed cam guides each having a pair of opposed, spaced cam blade assemblies. The first cam guide is located at the end of the first canted sweep arm and the second fixed cam guide is located at a predetermined location along the arm intermediate the first cam guide and the pivot point of the first canted sweep arm. Each cam assembly has an upper and lower contoured blade defining a capture gap formed of a thin section, a sloped ramp and a thick section defining a clamping throat. A drive mechanism is operatively coupled to the first canted sweep arm to rotate the same from a loading position wherein the magnetic recording and reproducing head assemblies are transported with the heads away from the surface of the rotating discs into the space between a pair of rotating discs and upon rotation of the first canted sweep arm away from the loading position into a disengage position enabling the magnetic heads to be loaded onto the surface of a rotating disc.

10 Claims, 14 Drawing Figures

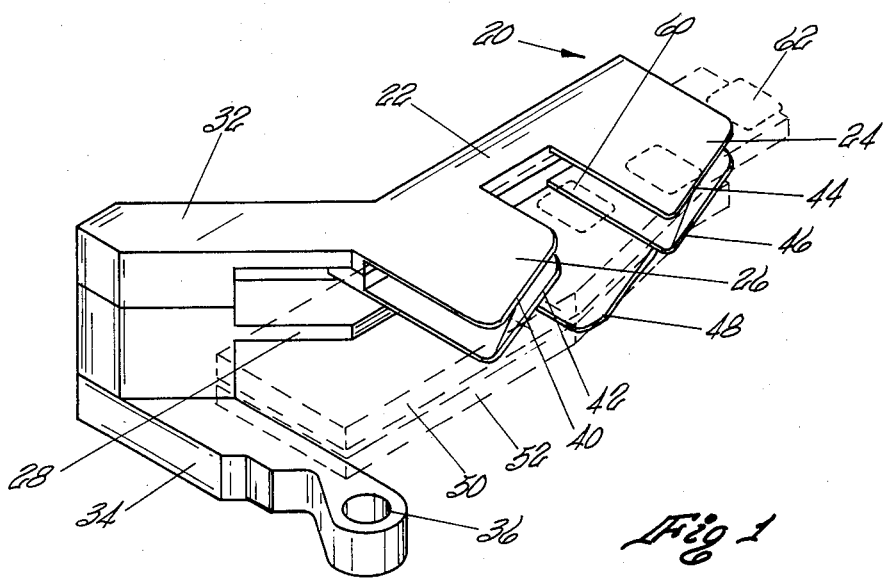
Fig 1
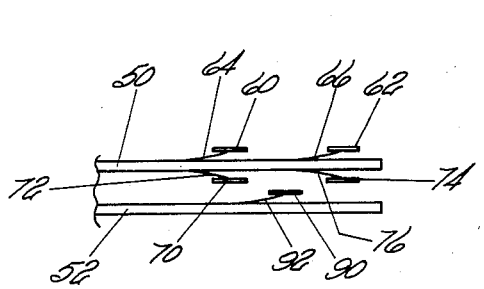
Fig 2 PRIOR ART
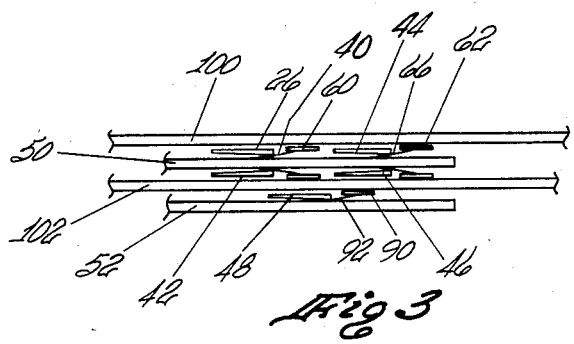
Fig 3
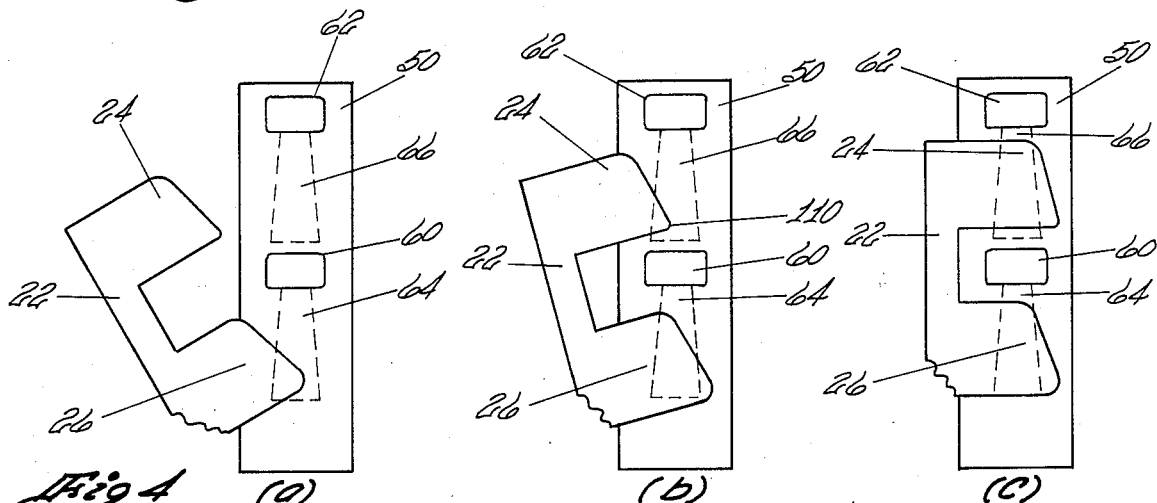
Fig 4  (a)    (b)    (c)
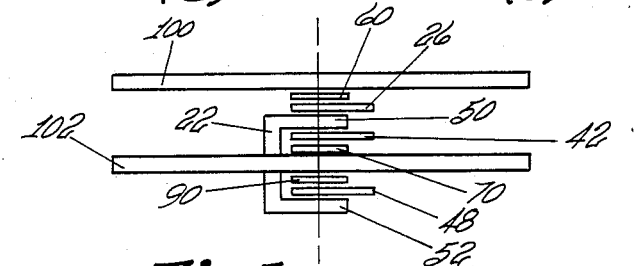
Fig 5

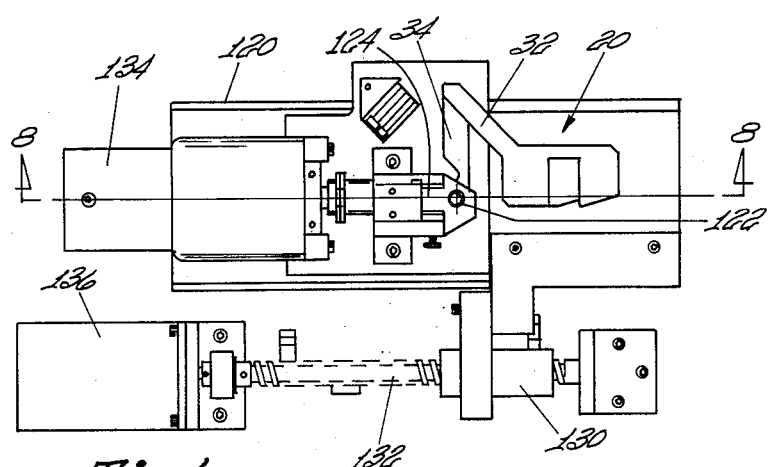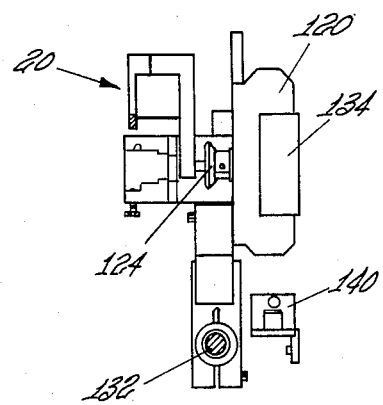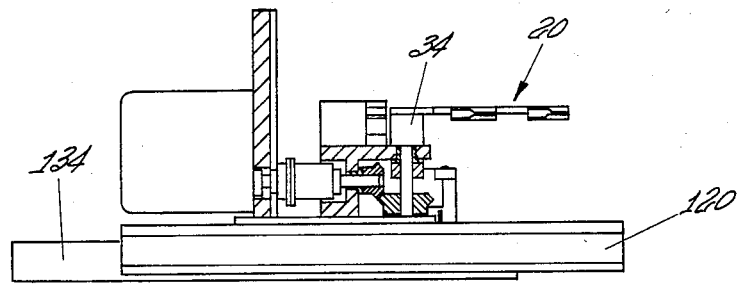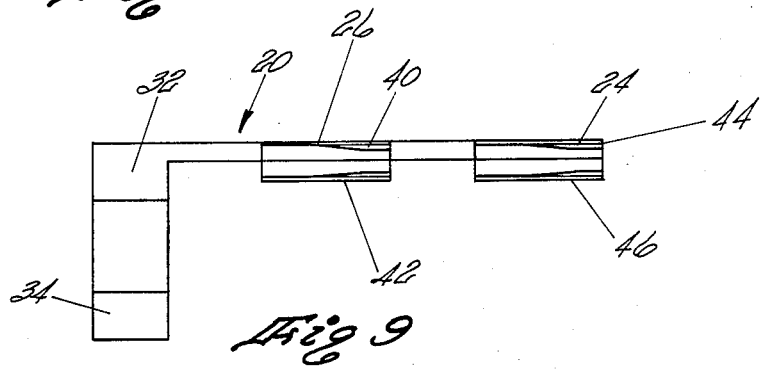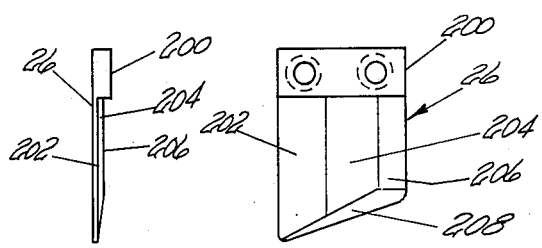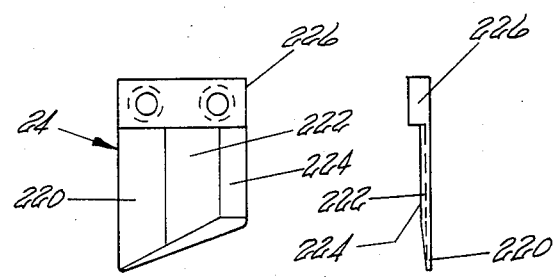

TRAVERSING APPARATUS FOR LOADING A MAGNETIC HEAD-LOADING ARM ASSEMBLY ONTO ROTATABLE DISCS

BACKGROUND OF THE INVENTION

1. Field of the Invention

This invention relates to apparatus for traversing a magnetic head-loading arm assembly in the form of a pair of loading arms, each having magnetic head assemblies mounted thereon through gimbal springs onto a rotating disc and more particularly to apparatus for traversing a magnetic head-loading arm assembly into position between a pair of spaced rotating discs wherein the gimbal spring magnetic head assemblies are urged by a comb assembly into a position adjacent to the loading arm such that when the magnetic head-loading arm assemblies are positioned in the space between the rotating discs, the comb assembly is moved into a disengage position loading the magnetic heads onto the rotating disks.

2. Field of the Invention

Disc driving apparatus utilizing a plurality of discs stacked one above the other for rotation about the same axis of rotation is well known in the art. Typically, a plurality of magnetic recording and reproducing heads and a magnetic servo head are mounted on a carriage loading arm assembly which is adapted to be actuated lengthwise in a straight-line path along the radii of the rotating magnetic discs. In the known disc drive apparatus, the carriage loading arm assembly includes means for holding the magnetic heads away from the surface of the disc during the loading operation (hereinafter referred to as the "loading position") and, when the carriage loading arm assembly is in position, the magnetic recording heads are disengaged from the carriage loading arm assembly and are permitted to move toward the surface of the rotating magnetic discs (hereinafter referred to as the "disengage position"). Typical of such systems are those offered for sale and sold by IBM Corporation and generally referred to as the 3378 Winchester-type system.

It is also known to the art to provide for a rotary actuated loading mechanism to position the magnetic heads on the disc drive apparatus at an angle relative to the rotating discs. In such apparatus, the magnetic heads are moved along an arc roughly coinciding with the radius of the disc extending across the disk recording area. One such head-loading mechanism for rotary actuation of heads relative to the rotating discs is disclosed in U.S. Pat. No. 4,071,867. The head loading mechanism described in U.S. Pat. No. 4,071,867 includes a pair of hinge-connected cam members having cam surfaces which bear against extending ends of a spring member mounted onto a rotatable elongated arm which supports the recording head. The disc's end of the elongated arm includes a spring member which decidedly engages hinge cam members during the loading operation. The cam members of the head loading mechanism cooperate with an extended end of a spring member so as to hold the magnetic heads away from the surface as they are moved from a position away from the disc pack to a position over the disc surfaces.

It is also known in the art to utilize apparatus for traversing a magnetic head-loading arm assembly along a linear path to load magnetic head-loading arm assemblies onto rotating test discs for testing purposes. Certain of the known magnetic head testing apparatus utilize a cam surface in the form of a contoured knife blade to engage in whole and magnetic heads in a position to avoid contact with the rotating disc surface during loading and unloading operations. The carriage-loading arm assembly had the magnetic heads supported thereon by arcuate shape flexures, and the contact between the camming members and the arcuate shape flexures was not critical, and the engagement there between was controlled by forming a steep slope angle on the edge of the cam members. Such transversing apparatus was utilized for testing carriage loading arm assemblies and the rotating disc apparatus generally referred to as the type 3350 Winchester system.

With the advent of higher density disc-drive apparatus, the size of the magnetic recording and reproducing heads and magnetic servo heads have become smaller and more critical. The gimbal spring magnetic recording and reproducing head assembly construction utilizes a flexure wherein the loading forces placed thereon and the deflection thereof, in terms of gram-loading, become significant.

SUMMARY OF THE PRESENT INVENTION

The present invention discloses a novel, unique and improved apparatus for traversing a magnetic head-loading arm assembly onto a pair of spaced rotating discs. In the preferred embodiment, the magnetic head-loading arm assemblies comprise two parallel loading arms. One of the loading arms has two pairs of spaced, gimbal spring magnetic recording and reproducing head assemblies located one each on the upper and lower side thereof. The gimbal spring magnetic recording and reproducing head assemblies are resiliently supported from the loading arm surface, with each upper and lower magnetic recording and reproducing head assemblies being in alignment with each other. The other of the loading arms has one gimbal spring magnetic servo head assembly located on the upper side thereof spaced from an intermediate the aligned gimbal spring-magnetic recording and reproducing head assemblies on the one loading arm assembly. The traversing apparatus includes a comb assembly having a pivotally mounted, first canted sweep arm having first and second fixed cam guides wherein each of the fixed cam guides have a pair of opposed, spaced cam blade assemblies. The first cam guide is located at the end of the first canted sweep arm, and the second fixed cam guide is located at a predetermined location along the first canted sweep arm intermediate the first cam guide and the pivot point. Each of the pair of opposed spaced cam assemblies have an upper and lower contour blade defining a thin section having a sloped ramp at the edge thereof nearest the pivot point which defines a capture gap therebetween and wherein each of the thin sections extend into a thick section at the opposite edge thereof away from the pivot point defining a clamping throat between the thick section of the contoured blades. In addition, the traversing apparatus includes means operatively coupled to the first canted sweep arm to rotate the same from a disengaged position into a loading position with spaced, gimbal spring magnetic recording and reproducing head assemblies located on the upper and lower side thereof. The fixed cam guide assemblies spaced cam blade assembly releasably engage and capture one gimbal spring magnetic recording and reproducing head assembly in the capture gaps and are responsive to continued rotation thereof to urge the captured gimbal spring magnetic recording and reproducing head assembly into the clamping throat urging the upper and lower gimbal spring supporting said magnetic head assemblies toward each other to move the magnetic and recording head assemblies near the surface of the loading arm. This permits the traversing apparatus to transport the magnetic head-loading arm assembly into the space between the pair of rotating discs. After the traversing apparatus is in place, by rotation of the first canted sweep arm from the loading position into a disengage position, the gimbal springs are permitted to slide from the clamping throat back into the capture gap and out of the cam blade assemblies permitting the magnetic recording and reproducing heads to fly over the surface of each other rotating discs.

One advantage of the present invention is that the traversing apparatus is adapted for loading thin film flexures onto rotating magnetic discs.

Another advantage of the present invention is that magnetic head-loading arm assemblies which are adapted for use in the 3370-type Winchester technology which have triangular-shaped flexures which are responsive to a small loading force by deflecting from the loading position into an unloading position can be easily and safely loaded onto a pair of spaced, rotating magnetic discs for test purposes.

Another advantage of the present invention is that the traversing apparatus utilizes a comb assembly which includes a cam blade assembly having a contoured cam blade having a ramp surface which is ramped at a critical angle so as to slideably engage the triangular-shaped flexure at a critical angle and point and to place a minimum loading force thereon to urge the magnetic head supported by the gimbal springs in a position to be moved away from the surface of the rotating discs and toward the surface of the loading arms.

A further advantage of the present invention is that the traversing apparatus includes an integral comb assembly which can be moved from a disengaged position into a loading position which concurrently loads and supports the magnetic recording and reproducing head assemblies and a magnetic servo head assembly in a position to be moved away from the rotating surface of the disc during loading thereof along a linear radial path and upon movement of the comb assembly from its loading position to a disengaged position enables the magnetic head assemblies to be loaded on and fly over the surface of the rotating discs.

A yet further advantage of the present invention is that the traversing apparatus can be formed to have a plurality of cam loading assemblies wherein the contoured blade surface of the elements forming the cam blade assembly has a predetermined slope and ramp to place the minimum loading force against the triangular shape gimbal spring magnetic head assemblies so as to urge the same away from the surface of the rotating discs and toward the surface of the loading arm.

A still further advantage of the present invention is that once the traversing apparatus has been moved into position between the rotating discs, that rotation of the comb assembly from the loading position into the disengage position enables the magnetic heads to immediately and safely be loaded against a rotating disc.

A still further advantage of the present invention is that once the magnetic head-loading arm assemblies have been successfully tested on a rotating disc, that rotation of the integral comb assembly from the disengage position into the loading position unloads the magnetic heads from the rotating disc surface and urges the magnetic head assemblies away from the surface of the rotating disc and toward the surface of the loading arm assemblies such that the traversing apparatus can be removed along a radial path from the rotating disc for removal of the magnetic head-loading arm assemblies from the test fixture.

BRIEF DESCRIPTION OF THE DRAWINGS

The foregoing and other advantages and features of this invention will become apparent from the following description of the preferred embodiment, when considered together with the illustrations and accompanying drawings, which include the following figures:

FIG. 1 is a prospective view of the traversing apparatus illustrating the comb assembly wherein the magnetic head-loading arm assemblies are illustrated in phantom;

FIG. 2 is a pictorial representation of a magnetic head-loading arm assembly having two loading arm assemblies where the upper arm includes a plurality of gimbal spring magnetic recording and reproducing head assemblies and the lower loading arm includes a gimbal spring magnetic servo head assembly;

FIG. 3 is a diagrammatic illustration of the magnetic head-loading arm assembly of FIG. 2 position radially to the rotating discs with the comb assembly in the loading position;

FIGS. 4(a), 4(b) and 4(c) illustrate pictorially movement of the comb assembly from a disengaged position relative to a magnetic head-loading arm assembly in FIG. 4(a) to an intermediate position between the disengaged position and the loading position illustrated in FIG. 4(b) and in a loading position relative to the magnetic head-loading arm assembly illustrated in FIG. 4(c).

FIG. 5 is a pictoral representation of the traversing apparatus having a head-loading arm assembly mounted thereon radially loaded onto a pair of rotating discs;

FIG. 6 is a top view of a carriage means having a base and supporting mechanism for loading another embodiment of the traversing apparatus and head-loading arm assemblies onto the test discs;

FIG. 7 is a right end front view of the mechanism of FIG. 6;

FIG. 8 is a sectional view taken along section lines 8—8 of FIG. 6;

FIG. 9 is a side view of the comb assembly illustrated in FIG. 6;

FIG. 10 is a left side view of a contoured blade located on the first canted sweep arm nearest the pivot point;

FIG. 11 is a top view of the contoured blade of FIG. 10;

FIG. 12 is an end view of the contoured blade of FIG. 11;

FIG. 13 is a top view of a contoured blade located on the first canted sweep arm foward of the contoured blade of FIG. 10; and FIG. 14 is a right end view of the contoured blade of FIG. 13.

DESCRIPTION OF THE PREFERRED EMBODIMENT

FIG. 1 illustrates the apparatus for traversing a magnetic head-loading arm assembly generally as 20 adapted to be pivoted through a support arm and extended drive arm about opening or pivot point 36. The traversing apparatus 20 includes a comb assembly 22 which includes a pivotally mounted first canted sweep arm 32 having mounted thereon first and second cam guides 24 and 26 at one end and a support arm 34 at the other end thereof. The first cam guide 24 includes a pair of opposed, spaced cam blade assembly 44 and 46 which are located at a predetermined location along the first sweep arm 32. The second cam guide 26 includes a pair of opposed, spaced cam blade assembly 40 and 42 and the second cam guide 26 is located along the first sweep arm 32 intermediate the first cam guide 24 and the pivot point 36. The first and second cam guides 24 and 26 and first canted sweep arm 32 form a "C" shaped comb assembly.

The spaced cam blade assembly 44 and 46 of the first cam guide 24 and the cam blade assembly 40 and 42 of the second cam guide 26 includes means defining upper and lower contoured blades which have a thin section at the edge thereof nearest the pivot point 36 and which define a capture gap therebetween. Each of the thin sections of the contoured blades extends into a thick section at the opposite edge thereof away from the pivot point 36. The opposed, spaced thick sections of the contoured blades define a clamping throat therebetween.

A second, spaced, parallel, pivotally mounted canted sweep arm 28 is located on the comb assembly 22. In the preferred embodiment, the first and second canted sweep arms are joined together and cooperate with an extension member 34 having the pivot point 36 located at the end thereof.

The second canted sweep arm 28 has a single contoured blade 48 located thereon which is spaced from and located intermediate the first cam blade assembly 24 and the second cam blade assembly 26. The single contoured blade 48 has a single blade having a thin section on the surface or portion of blade 48 towards the first canted sweep arm and nearest the pivot point 36 and a thicker section located at the opposite edge thereof away from the pivot point. The second canted sweep arm 28 together with the single blade assembly 26 form an "L" shaped comb assembly.

Illustrated by dashed lines 50 and 52 are the upper and lower arms of a magnetic head-loading arm assembly having magnetic head assemblies, shown generally as 60 and 62, resiliently mounted thereon.

In the preferred embodiment, the blade assemblies are formed of nickel plated brass and the canted arms of the comb assembly 22 are formed of aluminum.

FIG. 2 illustrates a typical magnetic head-loading arm assembly, or "tree," as such are known in the art. The assembly illustrated in FIG. 2 are used in the IBM Model 3350 disc memory systems. Similiar assemblies having the servo head in the same plane as the data heads are used in the IBM Models 3370 and 3380 disc memory.

The magnetic head-loading arm assemblies illustrated in FIG. 2 includes two parallel loading arms 50 and 52. Loading arm 50 has the magnetic recording and reproducing head assemblies 60, 62, 70 and 74 mounted theron by gimbal springs 64, 66, 72 and 76, respectively. Specifically, one pair of the magnetic head assemblies 60 and 62 with its associated gimbal spring assemblies 64 and 66, respectively, are located on the upper surface of loading arm 50. The other pair of the magnetic head assemblies 70 and 74 with its associated gimbal spring assemblies 72 and 76.

The magnetic head assemblies 60, 62, 70 and 74 are located on the upper and lower surfaces on loading arm 50 in alignment with each other.

Also, the magnetic head-loading arm assembly of FIG. 2 has a servo magnetic head 90 supported by a gimbal spring 92 on the upper surface of the second or lower loading arm 52.

FIG. 3 illustrates the magnetic head-loading arm assembly of FIG. 2, with the same numerals as in FIG. 2 identifying the same elements, with the contoured blades 40, 42, 44, 46 and 48 of the comb assembly illustrated in the loading position and with the traversing apparatus transported between two, spaced, rotatable memory discs 100 and 102.

In the loading position illustrated in FIG. 3, the magnetic heads are supported in a spaced, nonoperative, noncontrol position relative to the discs 100 and 102.

The operative relationship between the magnetic head-loading arm assembly and the comb assembly is illustrated by the sequence of FIGS. 4(a), 4(b) and 4(c).

For purpose of example, the loading arm 50 is illustrated diagrammatically in FIGS. 4(a), 4(b) and 4(c) as having magnetic recording heads 60 and 62 support on its upper surface by gimbal springs 64 and 66. The comb assembly 22 is illustrated with the first and second cam guides 24 and 26 positioned relative to the loading arm.

FIG. 4(a) represents the comb assembly 22 moving from its disengaged position where the contoured blades of the second cam guide 26 slideably engage and capture the gimbal spring 64 supporting magnetic head 60 in the capture gap formed between the thin sections of the contoured blades thereof. The first cam guide 24 has not engaged the gimbal spring 66 since the first canted sweep arm 32 only commenced its movement, which preferably is in parabolic path shown by arrow 106.

FIG. 4(b) illustrates the contour blade of the first cam guide 24 slideably engaging the gimbal spring 66 while the second cam guide 26 slideably moves the gimbal spring 64 from the capture gap to the clamping throat located between thick portions of the contoured blades.

FIG. 4(c) illustrates the comb assembly in its loading position wherein both gimbal springs 66 and 64 are engaged in the clamping throat defined by the thick sections of the contoured blades of the first and second cam guides 24 and 26 respectively. When the traversing apparatus is in the loading position illustrated in FIG. 4(c), a carriage assembly then transports the traversing apparatus along a radial path between the rotating discs 100 and 102 as illustrated in FIG. 5. When the magnetic head-loading arm assemblies are in position to be unloaded onto and fly over the rotating disc 100 and 102, the sequence illustrated in FIGS. 4(a), 4(b) and 4(c) are reversed by pivoting the comb assembly from the loading position of FIG. 4(c) to a disengaged position where second cam guide 26 is out of engagement with the gimbal spring 64.

The carriage means or assembly is illustrated in FIGS. 6, 7 and 8. The comb assembly illustrated in FIGS. 6, 7, 8 and 9 are adapted for testing magnetic head-loading arm assemblies for IBM Model 3370 and 3380 disc memories. The traversing apparatus 20 is pivotally mounted by fastener 122 to a moveable member 124, all of which is integral with a base 120. Base 120 and the traversing apparatus are moveable linearly (which is radial to the discs) on a track 134. A driver 130 and worm gear 132 supported by plate 136 is the transporting means for moving the base plate 134 linearly along the track 134. The moving member 124 is controlled to move the comb assembly 20 between the disengaged position and loading position. As illustrated in FIG. 1, the support arms of the comb assembly are mounted such that the comb assembly is at an acute, counter-clockwise angle, which places the left edge of the comb assembly at an acute angle to and to the left of the longitudinal axis of the canted sweep arms 28 and 32.

FIG. 9 illustrates the structure of the contoured blades 40 and 42, 44 and 46. The contoured blades have a thin section nearest the pivot point located at the end of an elongated drive arm 34. In the blade assemblies, blades 40 and 42 and 44 and 46 thin sections define a capture gap which initially engages the gimbal spring. The thick sections of the blade assemblies define a constriction or throat functioning as a clamping gap which hold the gimbal springs in a clamped position to insure no head-to-disc contact during the radial loading of the same onto the rotating discs.

The single servo blade 48 does not require a capture gap or clamping throat.

In order to insure a positive, nondestructive initial engagement between the second cam guide, the upper contoured blade 26 is fabricated with a ramp surface or edge 208 as illustrated in FIGS. 10 and 11. The contoured blade has a mounting edge 200 supporting the contoured blade and the blade itself has a thin section 202, a ramp guide section 204 and a thick section 206. The thickness relationship between sections 202, 204 and 206 is illustrated in FIG. 12. The slope of the ramp surface 208 is selected to be an acute angle. In the preferred embodiment, the angle as about 8°.

FIGS. 13 and 14 illustrate the preferred shape for a contoured blade for the first cam guide 24. The blade has a mounting edge 226, a thin section 220, a ramp guide surface 222 and a thick section 224.

The angle of the edge of the blade 228 is selected to insure slideable engagement with the gimbal spring. This angle may be in the order of 15°.

The traversing apparatus has utility in magnetic head testing systems having fixed, rotatable discs. However, the teachings hereof are applicable to a plurality of axially aligned, rotatable disc systems where the magnetic heads can be positively and reliably loaded onto rotating discs.

What is claimed is:

1. Apparatus for traversing a magnetic head-loading arm assembly onto a pair of spaced rotating discs wherein the magnetic head-loading arm assembly includes two parallel loading arms, one of which has two pairs of spaced gimbal spring magnetic recording and reproducing head assemblies resiliently supported from the loading arm surface and with each upper and lower magnetic recording and reproducing head assemblies in alignment with each other, said traversing apparatus comprising a comb assembly including a pivotally mounted first canted sweep arm having first and second fixed cam guides wherein each of said fixed cam guides have a pair of opposed, spaced cam blade assemblies, said first cam guides being located at the end of said first canted sweep arm and the second fixed cam guide being located at a predetermined location along said arm intermediate said first cam guide and the pivot point of said first canted sweep arm, each of said pairs of opposed, spaced cam blade assemblies including means for defining upper and lower contoured blades having a thin section at the edge thereof nearest said pivot point and a capture gap therebetween and wherein each of the thin sections extend into a thick section at the opposite edge thereof away from said pivot point defining a clamping throat between the thick section of said contoured blades, said spaced cam blade assembly also including means defining a ramp between said thick and thin sections; and means operatively coupled to said first canted sweep arm to rotate the same from a disengage position in which the parallel loading arms are permitted to move towards the surface of a rotating disc into a loading position in which the parallel loading arms are held away from the surface of a rotating disc having the spaced, gimbal spring magnetic recording and reproducing head assemblies located on the upper and lower side thereof wherein said space fixed cam guide spaced cam blade assemblies slideably engage and capture one gimbal spring magnetic recording and reproducing head assembly in the capture gaps and in response to continued rotation thereof urges the captured gimbal spring magnetic recording and reproducing head assembly into the clamping throat, urging the upper and lower gimbal spring supporting supporting said magnetic head assemblies towards each other and moving the magnetic recording and reproducing head assemblies near the surface of the loading arm to permit the traversing apparatus to transport the same into the space between said pair of rotating discs and upon rotation of the first canted sweep arm away from the loading position into a said disengage position enabling the gimbal spring to slideably travel from the clamping throat back into the capture gap and out of the cam blade assemblies permitting the magnetic recording and reproducing heads to fly over a surface of each of the rotating discs.

2. The traversing apparatus of claim 1 wherein the other of said two parallel loading arms has one gimbal spring magnetic servo head assembly located on the upper side thereof spaced from and intermediate the aligned gimbal spring magnetic recording and reproducing head assemblies, said traversing apparatus further comprising a second spaced, parallel pivotally mounted canted sweep arm having a single contoured cam blade assembly, said single contoured cam blade assembly being located on said second canted sweep arm and spaced from and located intermediate said first and second cam blade assemblies on said first canted sweep arm, said single blade having a thin section located thereon on the surface facing towards said first canted sweep arm near said pivot point and extending into a thick section located at the opposite edge thereof away from said pivot point, said single contoured blade being moveable with said first canted sweep blade from a said disengage postion to slideably engage a said gimbal spring of the gimbal spring magnetic servo head with the thin section of said single contoured blade urging said gimbal spring and magnetic servo head towards said arm and upon rotation of the first and second canted sweep arm from the loading position to the disengage position to enable the gimble spring to slideably travel from the clamping throat back into the thin section and away from the single countered blade permitting the magnetic servo head to fly over one of the rotating discs.

3. The traversing apparatus of claim 2 further comprising carriage means operatively coupled to said traversing apparatus and including means adapted to support said magnetic head-loading arm assembly thereon which is adapted to be loaded onto said recording disc for transporting the traversing apparatus radially from an extended loading stage exterior to the rotating disc to an internal unloading stage located in a space between the rotating disc.

4. The traversing apparatus of claim 2 wherein said first canted sweep arm has the cam blade assemblies integral with said first sweep arm to form a "C" shaped upper comb-like member with the upper contour blades and wherein the single contoured blade is integral with the second canted sweep arm to form a "L" shaped member.

5. The traversing apparatus of claim 2 wherein the single contoured blade has a sloped engagement surface located on a thin section thereof at the portion of the thin section adapted to first slideably engage said gimbal springs.

6. The traversing apparatus of claim 5 wherein the thin section of said single contoured blade has an internal thin flat portion which extends into a slope portion intermediate the center of the single contoured blade which in turn further extends into a flat thicker surface.

7. The traversing apparatus of claim 6 wherein said sloped engagement surface is located on the initial flat portion and at the corner thereof furtherest removed from the first canted sweep arm.

8. The traversing apparatus of claim 7 wherein the angle of the slope of the sloped engagement surface is about 15°.

9. The traversing apparatus of claim 7 wherein said blade assemblies are formed of nickel plated brass and wherein said first and second canted sweep arms are formed of aluminum.

10. The traversing apparatus of claim 4 wherein each of said first and second canted sweep arms has a support arm portion and a cam blade assembly support portion wherein the support arm is affixed to and integral with the cam blade assembly support portion and is mounted at an angle thereto such that the remote end of the support arm disposed from the cam blade assembly support portion is located at an acute, counterclockwise angle; and an elongated drive arm having a first and second end wherein said first end thereof is affixed to the remote end of said support arm and wherein the second end thereof is the pivot point.

* * * * *